(12) United States Patent
Guillemet

(10) Patent No.: US 11,995,574 B2
(45) Date of Patent: May 28, 2024

(54) EXPLAINABLE MACHINE LEARNING PREDICTIONS

(71) Applicant: SAP SE, Walldorf (DE)

(72) Inventor: David Guillemet, Paris (FR)

(73) Assignee: SAP SE, Walldorf (DE)

( * ) Notice: Subject to any disclaimer, the term of this patent is extended or adjusted under 35 U.S.C. 154(b) by 235 days.

(21) Appl. No.: 16/688,818

(22) Filed: Nov. 19, 2019

(65) Prior Publication Data

US 2021/0150391 A1     May 20, 2021

(51) Int. Cl.
    *G06N 5/045*      (2023.01)
    *G06N 5/01*      (2023.01)
    *G06N 20/00*      (2019.01)

(52) U.S. Cl.
    CPC ............. *G06N 5/045* (2013.01); *G06N 5/01* (2023.01); *G06N 20/00* (2019.01)

(58) Field of Classification Search
CPC ........ G06N 5/045; G06N 20/00; G06N 20/10; G06N 20/20; G06N 5/003
See application file for complete search history.

(56) References Cited

U.S. PATENT DOCUMENTS

| | | | | |
|---|---|---|---|---|
| 2018/0365578 | A1* | 12/2018 | Naughton | G06F 16/9027 |
| 2019/0019106 | A1* | 1/2019 | Driscoll | G06N 20/00 |
| 2019/0042887 | A1* | 2/2019 | Nguyen | G06N 20/00 |
| 2021/0065191 | A1* | 3/2021 | De Shetler | G06Q 20/203 |

OTHER PUBLICATIONS

Potapenkov, Pavel, Advocating YAML as DSL (https://medium.com/@pavelpotapenkov/advocating-yaml-as-dsl-7f5fe695fba9), pub. Feb. 23, 2017, 4 pages (Year: 2017).*

Brownlee, Jason, A Gentle Intro to the Gradient Boosting Algorithm for Machine Learning (https://web.archive.org/web/20181120145404/https://machinelearningmastery.com/gentle-introduction-gradient-boosting-algorithm-machine-learning/), retrieved from web.archive.org, pub. Nov. 20, 2018, 9 pages (Year: 2018).*

Heno, Helena, "SHAP (SHapley Additive exPlanations)", retrieved from GitHub SHAP_tutorial/README.md at master helenaEH/SHAP_tutorial (https://github.com/helenaEH/SHAP_tutorial/blob/master/README.md), last committed Sep. 19, 2019, 3 pages (Year: 2019).*

* cited by examiner

*Primary Examiner* — Li B. Zhen
*Assistant Examiner* — William Wai Yin Kwan
(74) *Attorney, Agent, or Firm* — Buckley, Maschoff & Talwalkar LLC

(57) ABSTRACT

Systems, methods, and computer products are described herein for explainable machine learning predictions. An application receives data including a specification that defines a trained machine learning (ML) model. The application parses a model description of the trained ML model. An engine factory creates an instance of an engine based on the model description. The application generates a user interface (UI) for requesting a prediction and an associated explanation using the engine. The UI receives user input data including a requested prediction having one or more influencers. The engine determines and provides the prediction and the associated explanation based on the user input data.

20 Claims, 16 Drawing Sheets

| Property | Description | Type |
|---|---|---|
| modelType | The type of the predictive mode. It can take the following values:<br>• Regression<br>• binaryClass<br>• Multiclass | String |
| numberOfClasses | The number of classes for the target variable | Integer |
| binaryDecisionThreshold | The probability threshold for binary classification. If the probability is greater than this value, the final decision will be mapped to the positive class. In the other case, it will be mapped to the negative class | Number |
| baseScore | The initial score for each class | Number |
| target | Information about the target variable | Target |
| contributionNormalization | Information about the normalization of the individual contributions (e.g., importance values) | ContributionNormalization | modelInformation Property

FIG. 4

| Property | Description | Type |
|---|---|---|
| variable | The name of the target variable | String |
| storage | The storage type of the target | String |
| categories | An array that contains all target categories. The type of the categories depends on the target storage. | Array of <any> |
| positiveClass | The positive class of the target. If the predicted probability is greater than the decision threshold, the final decision will be the positive class. | Any |
| negativeClass | The negative class of the target. If the predicted probability is lower or equal than the decision threshold, the final decision will be the negative class. | Any |
| scaling | A possible scaling to apply to the final score and the individual contributions. | Object | targetProperty

FIG. 5

| Property | Description | Type |
|---|---|---|
| mean | The mean of the importance values | Number |
| stdDev | The standard deviation of the importance values | Number | contributionNormalization Property

FIG. 6

| Property | Description | Type |
|---|---|---|
| encodedVariable | The name of the encoded variable (feature) used in the decision trees | String |
| variable | the name of the original variable | String |
| valueType | the type of the variable:<br>- "continuous"<br>- "nominal"<br>- "ordinal" | String |
| storageType | the storage type of the influencer:<br>- "number"<br>- "integer"<br>- "[u]string"<br>- "date[time]" | String |
| transformation | The transformation to apply to the original influencer value can have the following values: DayOfWeek, DayOfMonth, DayOfYear, WeekOfMonth, WeekOfYear, MonthOfQuarter, MonthOfYear, Year, QuarterOfYear, Hour, Minute, Second, MicroSecond | String |
| encoding | An array that contains all encoding conditions | Array of EncodingCondition |
| defaultValue | the default encoded value for any value that does not fulfil any encoding condition | Number |
| missingString | the string value that is associated with an empty value | String |
| missingValue | the encoded value to use in case the influencer value is considered as empty | Null or Number | modelInfluencer Property

FIG. 7

| Property | Description | Type |
|---|---|---|
| category | The value of the influencer category (the type depends on the influencer storage) | Any |
| encodedValue | The encoded value for the condition | Number |

Encoding Condition – For Nominal Influencer

FIG. 8

| Property | Description | Type |
|---|---|---|
| min | The lower bound of the range of values | Any |
| minIncluded | True if the lower bound is included in the range, false otherwise | Boolean |
| max | The upper bound of the range of values | Any |
| maxIncluded | True if the upper bound is included in the range, false otherwise | Boolean |
| encodedValue | The encoded value for any value that is included in the specified range | Number |

Encoding Condition – For Ordinal Influencer

FIG. 9

| Index | Description | Type |
|---|---|---|
| 0 | The name of the feature used for the decision | String |
| 1 | The threshold used for the decision split | Number |
| 2 | The identifier of the node/leaf to navigate to if the influencer value is lower than the threshold | Number |
| 3 | The identifier of the node/leaf to navigate to if the influencer value is greater or equal than the threshold | Number |
| 4 | The identifier of the node/leaf to navigate to if the influencer value is missing | Number |
| 5 | The cover | Number |

6 Properties – Decision Node

FIG. 10

| Index | Description | Type |
|---|---|---|
| 0 | The leaf value = the decision tree prediction value | Number |
| 1 | The cover | Number |

2 Properties - Leaf

FIG. 11

| API Name | Description |
|---|---|
| getModelInfo | Returns an object that contains general information about the model, such as the target name, the target type, or the model type |
| getInfluencers | Returns all the influencers from the model |
| getScore | Returns a prediction based on a given observation, as a js object which contains a score/decision/probability (depending on the model type) as well as normalized individual contribution values, based on importance values. |

Engine Generated APIs

FIG. 12

| Property | Description | Type |
|---|---|---|
| modelType | The model type:<br>- "regression"<br>- "binaryClass"<br>- "multiclass" | String |
| target | The name of the target variable | String |
| targetType | The type of the target variable:<br>- "number"<br>- "integer"<br>- "[u]string" | String | getModelInfo - Output

FIG. 13

| Property | Description | Type |
|---|---|---|
| variable | The name of the influencer, i.e. the variable name | String |
| valueType | The value type of the influencer:<br>- "continuous"<br>- "nominal"<br>- "ordinal" | String |
| storageType | The storage type of the influencer.<br>- "number"<br>- "integer"<br>- "[u]string"<br>- "date[time]" | String |
| values | An array which contains the distinct values of a nominal influencer or an ordinal integer influencer | Array of <any> | getInfluencers - Output

FIG. 14

| Parameter | Description | Type |
|---|---|---|
| Influencers | An array containing the influencer values that describe the input observation to process. Each influencer contains the following properties:<br>- "variable" = the influencer name<br>- "value" = the influencer value | Array of <influencer> |
| Options | An object that contains some prediction options as single properties.<br>So far, the single available option is "normalizedContributions".<br>If it exists and its value is true, then the individual contributions will be normalized as a z-score value. | Object | getScore - Input

FIG. 15

| Properties | Description | Type |
|---|---|---|
| score | The prediction score | number or integer |
| decision | The prediction decision | <any> |
| proba | The probability of the decision | number |
| contributionArray | An array which contains the individual contributions for each influencer as an object that contains the following properties:<br>- "influencerName" = the name of the influencer<br>- "influencerContribution" = the individual contribution of the influencer | array of object | getScore - Output

FIG. 16

EXPLAINABLE MACHINE LEARNING PREDICTIONS

TECHNICAL FIELD

The subject matter described herein relates to enhanced techniques for explaining and/or interpreting machine learning predictions.

BACKGROUND

Machine learning (ML) can be used in a variety of applications such as predictive analytics. With predictive analytics, large volumes of historical data are used to train ML models that are deployed in a production environment. The trained ML model can be used to predict future scenarios, discover key influencers driving particular results, identify data outliers, analyze various data patterns, and/or simulate various "what-if" scenarios. Output predictions of such models can be used to inform future decisions or modify the algorithms within the ML model.

SUMMARY

In one aspect, a method implemented by one or more data processors forming part of at least one computing device includes receiving, by an application, data comprising a specification that defines a trained ML model. The application parses a model description of the trained ML model. An engine factory creates an instance of an engine based on the model description. The application generates an user interface (UI) for requesting a prediction and an associated explanation using the engine. The UI receives user input data comprising a requested prediction having one or more influencers. The engine determines and provides the prediction and the associated explanation based on the user input data.

In some variations, determining the prediction and the explanation can be achieved by encoding the user input data into one or more numeric features, browsing a plurality of decision trees defined within the specification to provide a raw prediction score, and determining an importance value for each influencer, the importance value comprising either (i) a SHapley Additive exPlanation (SHAP) value or (ii) a SHAP value normalized as a z-score using a mean and a standard deviation associated with training data used to train the ML model.

In other variations, the prediction and the associated explanation can include an array of individual contributions associated with each of the one or more influencers. The array can include an influencer name and importance value computed for the influencer.

In some variations, the trained ML model can be a regression model and the prediction includes a prediction score.

In other variations, the trained ML model can be a binary classification model or a multi-class classification model and the prediction includes a prediction decision and a probability associated with the prediction decision.

In some variations, the application can request model information associated with the specification. The model information can include at least one of a model type, a target name, or a target type.

In other variations, the application can request model influencers associated with the specification. The model influencers can include at least one of a name, a value type, a storage type, or a listing of values.

In other variations, the trained ML model can be trained using a gradient boosting technique and the trained ML model include a plurality of decision trees.

In some variations, the specification includes an array of nodes of decision trees arranged in a predefined order and mapped variable names to feature names. Each feature name can be an alphanumeric representation.

In other variations, the application can be a cloud-based web application.

In some variations, the specification includes a JavaScript Object Notation (JSON) specification.

In other variations, the instance of the engine can be a XGBoost JavaScript Runtime.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a runtime script such as a JavaScript runtime for leveraging, interpreting, and/or explaining ML model predictions. Understanding output predictions of a ML model can, in some cases, be just as important as the predictions themselves. The methods described herein relate to the integration of a ML model within a lightweight web environment that provides both predictions and explanations and/or interpretations of such predictions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 illustrates an example modelInformation property of ML model object of FIG. 3.

FIG. 5 illustrates an example target property of modelInformation of FIG. 4.

FIG. 6 illustrates an example contributionNormalization property of model information of FIG. 4.

FIG. 7 illustrates an example modelInfluencer property of ML model object in FIG. 3.

FIG. 8 illustrates an example encoding condition for a nominal influencer that can be within the encoding property of modelInfluencer property.

FIG. 9 illustrates an example encoding condition for an ordinal influencer.

FIG. 10 illustrates example properties of a decision node.

FIG. 11 illustrates example properties of a leaf.

FIG. 12 illustrates example application program interfaces output from engine.

FIG. 13 illustrates example output of the getModelInfo application program interface.

FIG. 14 illustrates example output of the getInfluencers application program interface.

FIG. 15 illustrates input parameters for the getScore application program interface.

FIG. 16 illustrates output properties output by the getScore application program interface.

Like reference symbols in the various drawings indicate like elements.

DETAILED DESCRIPTION

ML models can be used in a variety of different applications such as predict future scenarios, discover key influencers driving particular results, identify data outliers, analyze various data patterns, and/or simulate various "what-if" scenarios. ML models can be trained with large amounts of data. Once trained, ML models can apply what it learns to input data and generate output predictions based on the input data and the historical datasets used for training. Understanding how the ML model generates its output predictions, however, may not well understood. Being able to explain the output predictions of a ML model, however, may increase user confidence and/or buy off in deploying ML model in various business settings. Explaining and/or interpreting the ML predictions can increase overall trust in the ML model. The various systems and methods described herein create a ML engine such as a JavaScript ML engine based on a ML model export that evaluates individual contribution of each feature of a final prediction of the ML model. The ML engine consumes a ML export to provide a prediction as well as the individual contributions.

Figure 1:
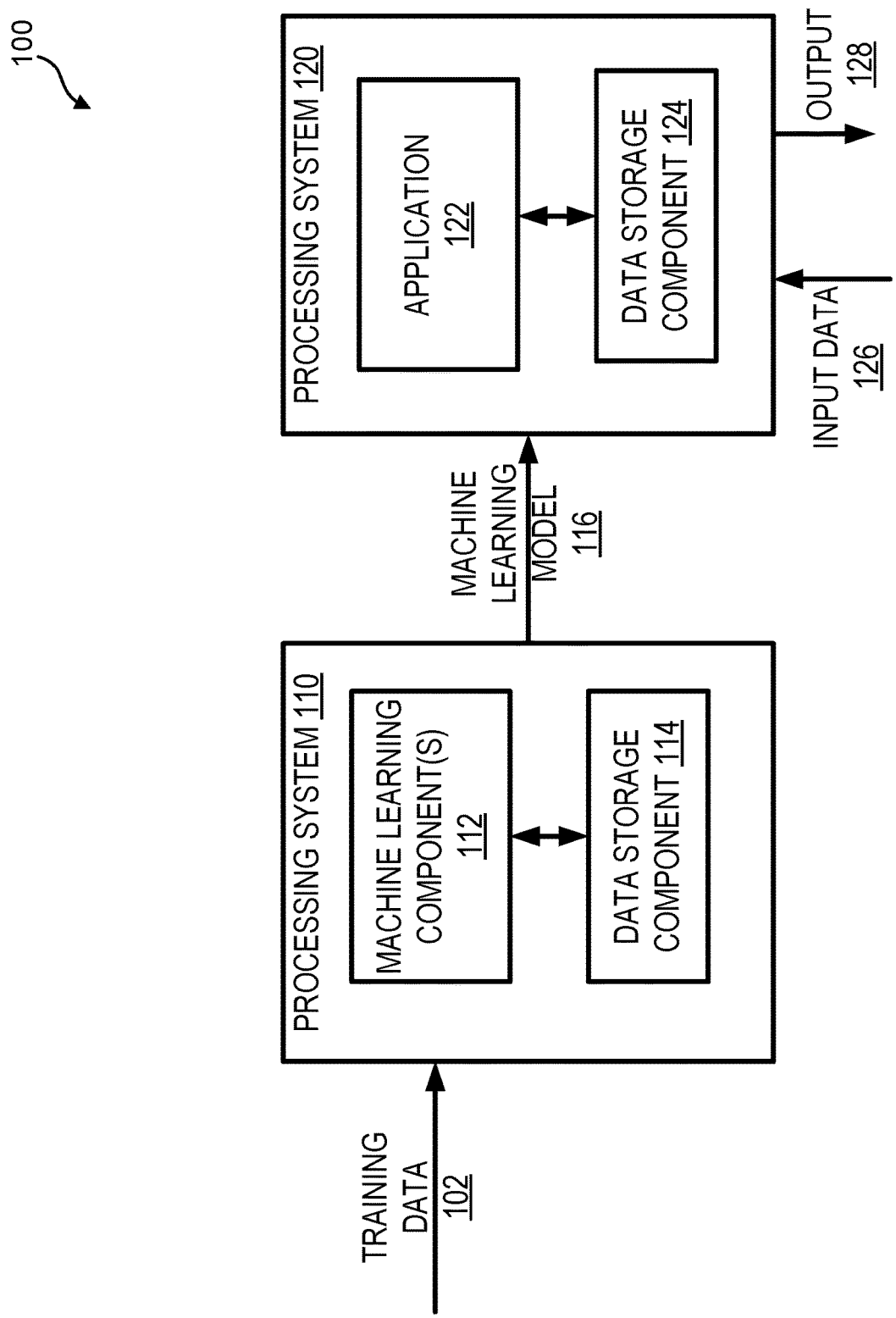
FIG. 1 illustrates an example system that generates an application for displaying predictions and explanations for input data.

FIG. 1 illustrates an example system 100 that generates an application 122 for displaying predictions and explanations for input data 126. Processing system 110 includes machine learning component(s) 112. ML component(s) 112 receives training data 102 and generates a ML model 116 as described in detail in U.S. patent application Ser. No. 16/023,119, filed Jun. 29, 2018, the contents of which is incorporated herein by reference in its entirety. For example, ML component(s) 112 can be trained using training data 102 such as historical data. Such historical data can include, for example, data in a number of various fields such as supply chain, weather, machine/equipment assets, maintenance, and the like. The ML component(s) 112 can be trained based on patterns, trends, anomalies, and the like, identified within historical data. The training dataset 102 can be received by the processing system 110 via a communications network, e.g., an Internet, an intranet, an extranet, a local area network (LAN), a wide area network (WAN), a metropolitan area network (MAN), a virtual local area network (VLAN), and/or any other network. The training dataset 102 can also be received via a wireless, a wired, and/or any other type of connection.

ML model 116 can be generated from the ML component(s) 112 based on the training. Examples of ML model 116 types include regression, binary classification, multi-class classification, clustering, time-series, and the like. ML component(s) 112 can use a gradient boosting technique for generating ML model 116. With a gradient boosting technique, a number of decision trees are generated using parallel processing techniques. Decision trees are a graphical representation of various potential predictions based on given conditions. Such a technique can be used to solve problems of regression, classification, ranging, and/or other predictions. The gradient boosting technique can run on various operational platforms and support a number of different programming languages including C++ and Python. In some variations, ML component(s) 112 can be an Extreme Gradient Boosting, XGBoost, model.

ML model 116 can have an associated specification that can include general information about the ML model 116, encoding information for various influencers found in the historical data, decision trees, and/or a description of a predictive formula (e.g., regression, classification, etc.). The specification can be in JavaScript Object Notation (JSON) format and include a definition of the ML model 116 along with transformations applied on raw data and influencers (e.g., variables of the model). The JSON format is not program code, but a description that can be parsed by a consumer system to extract the predictive formula therefrom and any other information needed, and integrated within applications written in multiple types of programming languages. The specification can enable an application developer/consumer to integrate the ML model 116 in a manner that best suits the application 122. The ML model 116 described by the specification can include equations (e.g., polynomials) having variables, data ranges, decision trees, and the like. For example, the ML model 116 can include an encoding function to be applied on each variable of the model, and formulas to compute various predictive indicators based on the model. In some variations, the ML model 116 may contain large numbers of decisions trees (e.g., hundreds or thousands) having various nodes based, for example, upon the number of influencers. The specification is defined in such as way so as to ensure that it can be exported to processing system 120 in a compact format. For example, the nodes of the decision trees can be described in an array that contains the node and leaf properties in a predefined order, rather than standard objects with property/value pairs. Additionally, the original variable names of the influencers can be mapped to shorter feature names (e.g., F0, F1, etc.).

Figure 2:
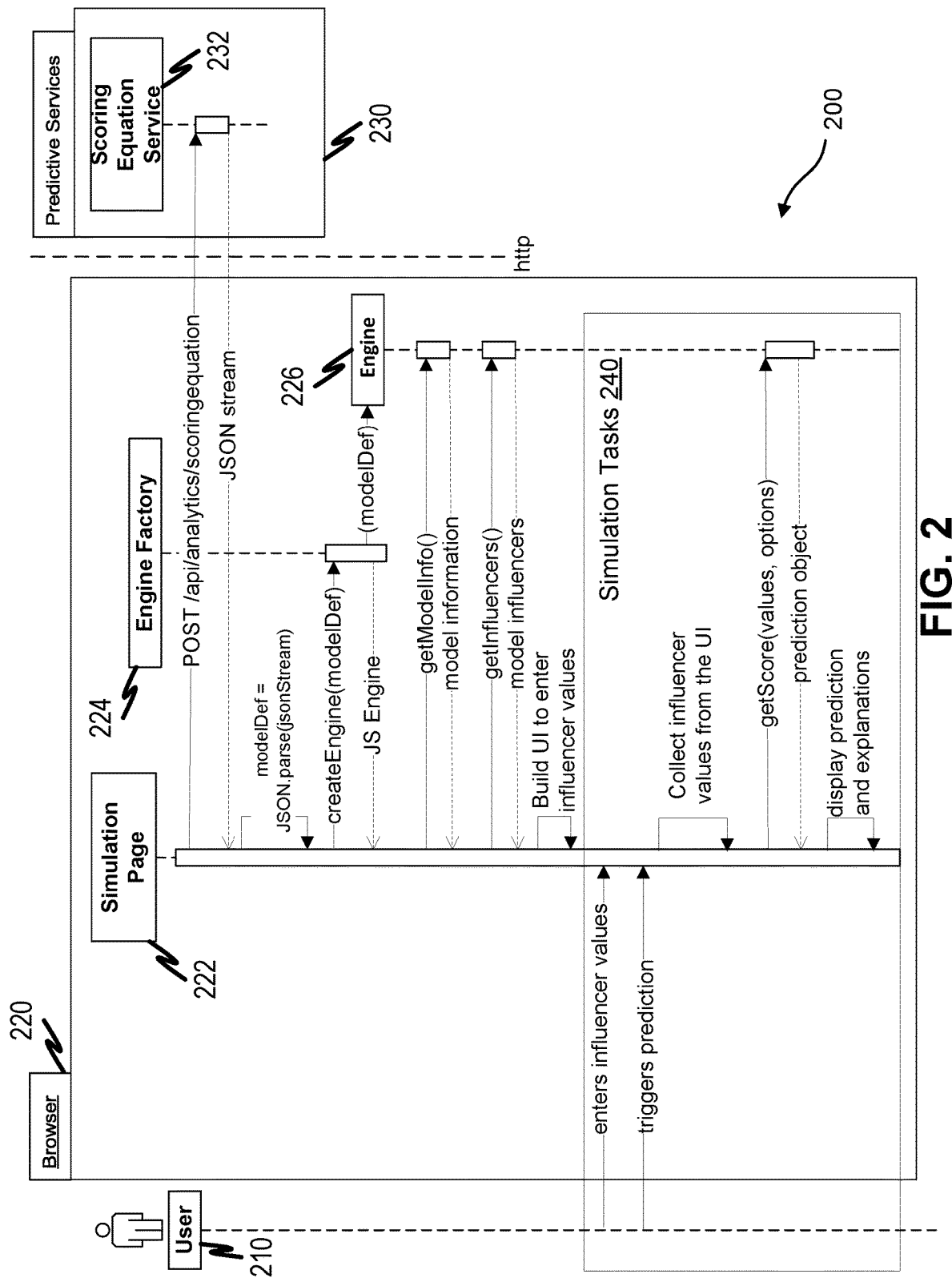
FIG. 2 illustrates an example sequence diagram for generating predictions and associated explanations.

An application 122 can be generated, as described in more detail in FIG. 2, based on the ML model 116. Application 122 can receive input data 126 such as live data relating to a particular business or operation. The specification associated with the ML model 116 can be parsed and integrated into application 122 in order to deploy the ML model 116. For example, a user can use a user interface (UI) that enables the user to select one or more ML models 116 which may be deployed and integrated with an application 122. For example, the UI can display or otherwise output a list of ML models available for integration within an application. The UI can also be used, as explained in more detail in FIG. 2, to input influencer values for evaluation by the ML model 116. With input data 126, application 122 can compute importance values associated with each influencer of the input data 126. The importance value can be a raw value or a standardized value (e.g., z-score normalization) that allows for ease of interpretation by a user. For example, the importance value can follow the empirical rule (e.g., 68-95-99.7 rule). The empirical rule describes a percentage of values that lie within a band around the mean in a normal distribution, with a width of two, four, and six standard deviations, respectively. In other words, about 68% of the values lie within one standard deviation of the mean, about 95% of the values lie within two standard deviations of the mean, and about 99.7% of the values lie within three standard deviations of the mean. If the z-score is greater than approximately 3, then the value is greater than approximately 99.7% of the population (e.g., the influencer contribution is significant). In some variations, such importance values can be Shapley Additive explanation (SHAP) values. The importance values can distribute the prediction among the various influencers of input data 126. The application 122 can encode the input data 126 into numerical features and browse each decision tree of the specification to accumulate single scores based on the encoded input data. Based on this encoding and browsing, application 122 can generate output 128 that can include a prediction and/or an explanation associated with the prediction. The explanation is based on the importance values associated with each model influencer.

Processing systems 110, 120 can be implemented using software, hardware and/or any combination of both. Processing systems 110, 120 can also be implemented in a personal computer, a laptop, a server, a mobile telephone, a smartphone, a tablet, and/or any other type of device and/or any combination of devices. The ML component(s) 112 may perform execution, compilation, and/or any other functions on the received training data 102 as well as machine learning functions, as discussed in further detail below. Processing systems 110, 120 can also include a data storage component 114, 124, respectively. The data storage components 114, 124 can be used for storage of data processed by processing systems 110, 120 and can include any type of memory (e.g., a temporary memory, a permanent memory, and/or the like). Although FIG. 1 illustrates separate processing systems for the ML component(s) 112 and application 122, it is recognized that such features can be implemented within a single processing system.

FIG. 2 illustrates an example sequence diagram 200 for generating predictions and associated explanations. A browser 220 can include a simulation page 222 (e.g., application 122), engine factory 224, and engine 226. The simulation page 222 can send a HyperText Transfer Protocol (HTTP) request, such as a POST, to predictive services 230. The HTTP request can be a request that predictive services 230 accept accompanying data (e.g., training data 102) for the training of ML component(s) 112. In some examples, the accompanying data can include application program interface (API) data, analytics, and/or scoring equations. Scoring equation service 232 can in turn generate a ML model 116 and export the model as a specification (e.g., JSON stream) to the simulation page 222. The simulation page can parse the specification to extract and generate a model description of the ML model 116 and freely integrate the model. Such parsing can be achieved, for example, using a parse function (e.g., modelDef=JSON.parse(jsonStream)).

Simulation page 222 can create an engine 226 based on the model description using an engine factory 224. For example, engine 226 can be created using a creation function (e.g., createEngine(modelDef)). Engine factory 224 can facilitate the creation of an engine 226 such as a JavaScript engine. Engine factory 224 can take an object as a single input parameter. Depending on the parameter format, the engine factory 224 can return either a Robust Regression JavaScript runtime or an XGBoost JavaScript runtime. If the parameter follows a JSON format as defined for a Robust Regression model type, a Robust Regression JavaScript runtime is returned. If the parameter follows the JSON format as defined in an XGBoost model JSON export, an XGBoost JavaScript runtime is returned. The format of the Robust Regression JSON specification is described in in U.S. patent application Ser. No. 16/023,119, filed Jun. 29, 2018, the contents of which is incorporated herein by reference in its entirety. Optionally, simulation page 222 can interface with engine 226 to obtain model information (e.g., model type, target name, target type) and/or influencers using appropriate functions (e.g., getModelInfo( ) and getInfluencers( ). Each influencer can contain information such as a name, value type (e.g., continuous, discrete, etc.), storage type (e.g., integer, number, string, etc.), and/or list of distinct values in case of nominal or ordinal integer. The influencer information can facilitate the dynamic building of a user interface (UI) that allows a user 210 to enter values for prediction simulations. With the model information and influencers, simulation page 222 can generate a UI for generating predictions and explanations based on input data 126 (e.g., live data) provided by a user 210.

A number of simulation tasks 240 can be performed for every simulation. For example, a user 210 can interface with the UI generated by simulation page 222. The user 210 can enter in a various influencer values and trigger the prediction through the UI. Simulation page 222 can collect this user input and interface with engine 226 to obtain prediction scores and associated explanations using an appropriate command (e.g., getScore(values, options)). These predictions can be generated by engine 226. The engine 226 can encode the influencers provided by user 210 into numeric features using an appropriate encoding algorithm that facilitates browsing of decision trees having a compatible numeric features. Engine 226 can browse the decision trees defined within the specification to get a final prediction associated with, for example, regression, binary classifications, and/or multi-class classifications. The relevant decision trees are also browsed for the computation of importance values associated with the influencers of interest. For multi-class classification, only the decision trees related to the predicted class are used for computation of the importance values. Simulation page 222 can provide the prediction scores and associated explanations to the user 210 by displaying them via the UI.

FIGS. 3-11 illustrate examples of various objects of data that can be included within a specification. It should be appreciated that the objects shown in FIGS. 3-11 are merely for ease of understanding and are not meant to limit the types and amount of objects that may be included within the specification. Listed below is an example specification described in the examples of FIGS. 3-11, but also can include additional and/or different data.

```
{
    "info": {
        "modelType": "regression" | "binaryClass" | "multiClass",
        "numberOfClasses": <number>,
        "binaryDecisionThreshold": <number>,
```

-continued

```
    "baseScore": <number>,
    "target": {
        "variable": <string>,
        "storage": "number" | "integer" | "string" | ...
        "categories": [<any>, <any>, ...],
        "positiveClass": <any>,
        "negativeClass": <any>,
        "scaling": {
            "mean": <number>,
            "stdDev": <number>
        }
    },
    "contributionNormalization": {
        "mean": <number>,
        "stdDev": <number>
    }
},
"influencers": [
    {
        "encodedVariable": <string>,
        "variable": <string>,
        "valueType": "nominal" | "ordinal" | "continuous",
        "storageType": "number" | "integer" | "string" |
        "date[time]"
        "transformation": "Year" | "DayOfMonth" | ...
        "encoding": [
            {
                "category": <any>,
                "encodedValue": <number>
            },
            ...
            {
                "min": <any>,
                "minIncluded": <boolean>,
                "max": <any>,
                "maxIncluded": <boolean>,
                "encodedValue": <number>
            },
            ...
        ],
        "defaultValue": <number>,
        "missingString": <string>,
        "missingValue": null | <number>
    },
    ...
],
"trees": [
    {
        "<nodeId>": [
            <string>,
            <number>,
            <number>,
            <number>,
            <number>,
            <number>
        ],
        ...
        "<leafId>": [
            <number>,
            <number>
        ],
        ...
    },
    ...
]
}
```

Figure 3:
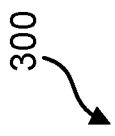
FIG. 3 illustrates an example of a ML model object.

FIG. 3 illustrates an example of a ML model object 300. ML model object 300 can include various properties: modelInformation, modelInfluencer, and/or trees. The information is an overview of the ML model 116. The influencers can be a listing of model influencers variables formatted as an array. The trees can be a listing of all decision trees formatted as an array.

FIG. 4 illustrates example modelInformation property 400 of ML model object 300 of FIG. 3, such as the model information provided by engine 226 to simulation page 222. The model information 400 can include a number of properties: modelType, numberOfClasses, binaryDecisionThreshold, baseScore, target, and/or contributionNormalization. The modelType can be a string that defines the type of ML model 116 such as regression, binary classification, or multi-class classification. NumberOfClasses can be an integer representing the number of classes for the target variable. For ML models 116 that are either regression models or binary classifications, the integer is equal to 1. BinaryDecisionThreshold can be a number representing the probability threshold for binary classification models. If the probability is greater than the binaryDecisionThreshold, the final decision can be mapped to the positive class. Otherwise, the final decision is mapped to the negative class. The baseScore can be a number that represents an initial score for each class. The target includes information about the target variable as described further in FIG. 5. The contributionNormalization can be information about the normalization of the individual contributions (e.g., importance values).

FIG. 5 illustrates an example target property 500 of modelInformation 400 of FIG. 4. Target property includes a number of properties: variable, storage, categories, positiveClass, negativeClass, and/or scaling. The variable and storage properties can be strings containing the name of the target variable and the storage type of the target, respectively. The categories property can be an array that contains all target categories, the type of which depends on the target storage. The categories property, however, can be applicable to multi-class classification ML models 116. The positiveClass can be a positive class of the target. For example, if a predicted probability is greater than a decision threshold, the final decision will be the positive class. The negativeClass can be a negative class of the target. For example, if a predicted probability is lower than or equal to a decision threshold, the final decision will be the negative class. Both the positiveClass and negativeClass properties can be applicable for binary classification ML models 116. The scaling property can be an object of a possible scaling to apply to the final score and/or the individual contributions.

FIG. 6 illustrates an example contributionNormalization property 600 of model information 400 of FIG. 4. The information about contributionNormalization facilitates the computation of a z-score normalization for a given absolute importance value (e.g., the number of standard deviations from the mean of a given importance value). A z-score can be computed using the following expression:

$$z_{score} = \frac{\text{Importance Value} - \text{mean}}{stdDev} \quad (1)$$

where stdDev represents the standard deviation. The contributionNormalization property 600 can include mean and stdDev properties. The mean can be a number representing a mean of the importance values. The stdDev can be a number representing the standard deviation of the importance values. Both the mean and stdDev values can be based on the importance values associated with the training data 102 (e.g., data provided by simulation page 222 to predictive services 230).

FIG. 7 illustrates an example modelInfluencer property 700 of ML model object 300 in FIG. 3, such as the information that passes from engine 226 to simulation page 222. ModelInfluencer property 700 can include various properties such as encoded Variable, variable, valueType, storageType, transformation, encoding, defaultValue, missingString, and/or missingValue. The encodedVariable property can be a string having the name of the encoded variable or feature used in the decision trees. The variable property can be a string having the name of the original variable. The valueType property can be a string having the type of variable such as continuous, nominal, or ordinal. The storageType property can be a string having the storage type associated with the influencer such as a number, integer, string, ustring, date, or datetime. The transformation property can define the transformation to apply to the original influencer value. The transformation property can be a string property that can have the following values: DayOfWeek, DayOfMonth, DayOfYear, WeekOfMonth, WeekOfYear, MonthOfQuarter, MonthOfYear, Year, QuarterOfYear, Hour, Minute, Second, MicroSecond. The transformation property can be applicable to storage types of "date" or "datetime." The encoding property can be an array that contains all encoding conditions. The encoding property can be applicable for valueTypes of nominal or ordinal. The defaultValue property can be a number representing the default encoded value for any value that does not fulfill any encoding condition. The missingString property can be a string having a string value that is associated with an empty value. In some variations, the missingString property is an optional property that can be excluded or included from modelInfluencer accordingly. The missingValue can be null or a number representing an encoded value to use in case the influencers value is considered as empty.

FIG. 8 illustrates an example encoding condition 800 for a nominal influencer that can be within the encoding property of modelInfluencer property 700. The encoding condition 800 can include properties of category and encodedValue. The category can be a value of the influencer category, the type depends on the influencer storage. The encodedValue can be a number that represents the encoded value for the condition.

FIG. 9 illustrates an example encoding condition 900 for an ordinal influencer. The encoding condition 900 can include the following properties: min, minIncluded, max, maxIncluded, and encodedValue. The min property can define a lower bound of the range of values. The minIncluded property can be a Boolean expression that is true if the lower bound is included in the range, and otherwise false. The max property can define an upper bound of the range of values. The maxIncluded property can be a Boolean expression that is true if the upper bound is included in the range, and otherwise false. The encodedValue property can be a number that represents the encoded value for any value that is included in the specified range.

To minimize the size of the generated exported ML model 116, a decision tree can be encoded as a map of identifiers (e.g., a string to an array of values), the root node can be the node whose identifier is "0". The type of the node can be deduced from the length of the array, e.g., the number of node properties.

FIG. 10 illustrates example properties of a decision node 1000. A decision node can include six (6) index values ranging from 0 to 5. The index value of 0 can be a string that includes the name of the feature used for the decision. The index value of 1 can be a number that represents the threshold used for the decision split. The index value of 2 can be a number that represents the identifier of the node/leaf to navigate to if the influencer value is lower than a threshold. The index value of 3 can be a number that represents the identifier of the node/leaf to navigate to if the influencer value is greater than or equal to a threshold. The index value of 4 can be a number that represents the identifier of the node/leaf to navigate to if the influencer value is missing. The index value of 5 is a number that represents the cover that is used in the computation of the importance value.

FIG. 11 illustrates example properties of a leaf 1100. The leaf 1100 can include two (2) index values ranging from 0 to 1. The index value of 0 can be a number representing the leaf value that is equal to the decision tree prediction value. The index value of 1 can be a number representing the cover that is used in the computation of the importance value.

FIG. 12 illustrates example APIs 1200 output from engine 226. Engine 226 can output a getModelInfo API that returns an object that contains general information about the model such as target name, target type, or the model type. FIG. 13 illustrates example output 1300 of the getModelInfo API which includes properties such as modelType, target, and targetType. The modelType property can be a string that includes the model type as regression, binary classification, or multi-class classification. The target property can be a string that includes the name of the target variable. The targetType property can be a string that includes a type associated with the target variable such as a number, integer, string, or ustring.

Engine 226 can also generate a getInfluencers API that returns all influencers of the ML model 116. FIG. 14 illustrates example output 1400 of the getInfluencers API. For example, the getInfluencers API can output properties including variable, valueType, storageType, and/or values by returning an array of influencers, and each object (e.g., influencer) in this array contains the specified properties (e.g., variable, valueType, etc.). The variable property can be a string defining the name of the influencer (e.g., variable name). The valueType property can be a string defining the value type of the influencers such as continuous, nominal, or ordinal. The storageType property can be a string that defines the storage type of the influencer such as number, integer, string, ustring, date, or datetime. The values property can be an array that contains the distinct values of a nominal influencer or an ordinal integer influencer.

Engine 226 can also generate a getScore API that returns a prediction based on a given observation as an object (e.g., js object) containing a score, decision, or probability based on the model type. The object also includes normalized individual contribution values based on the importance values. FIG. 15 illustrates input parameters 1500 for the getScore API. The input parameters include influencers and options. The influencers parameter can be an array containing influencer values that describe the input observation process. Each influencer contains a variable that is the influencer name and a value that is the influencer value. The options parameter is an object that contains prediction options as single properties (e.g., normalizedContributions). If it exists and its value is true, then the individual contributions are normalized as a z-score value associated with Equation (1). FIG. 16 illustrates output properties 1600 output by the getScore API. The properties include score, decision, proba, and contributionArray. The score property can be a number or an integer that represents the prediction score. The decision property can be the prediction decision. The proba can be a number representing the probability of the decision. The contributionArray property can be an array of objects that contains the individual contributions for each influencer as an object that contains an influencer Name (e.g., the name of the influencer) and an influencerContribution (e.g., the individual contribution of the influencer).

Figure 17:
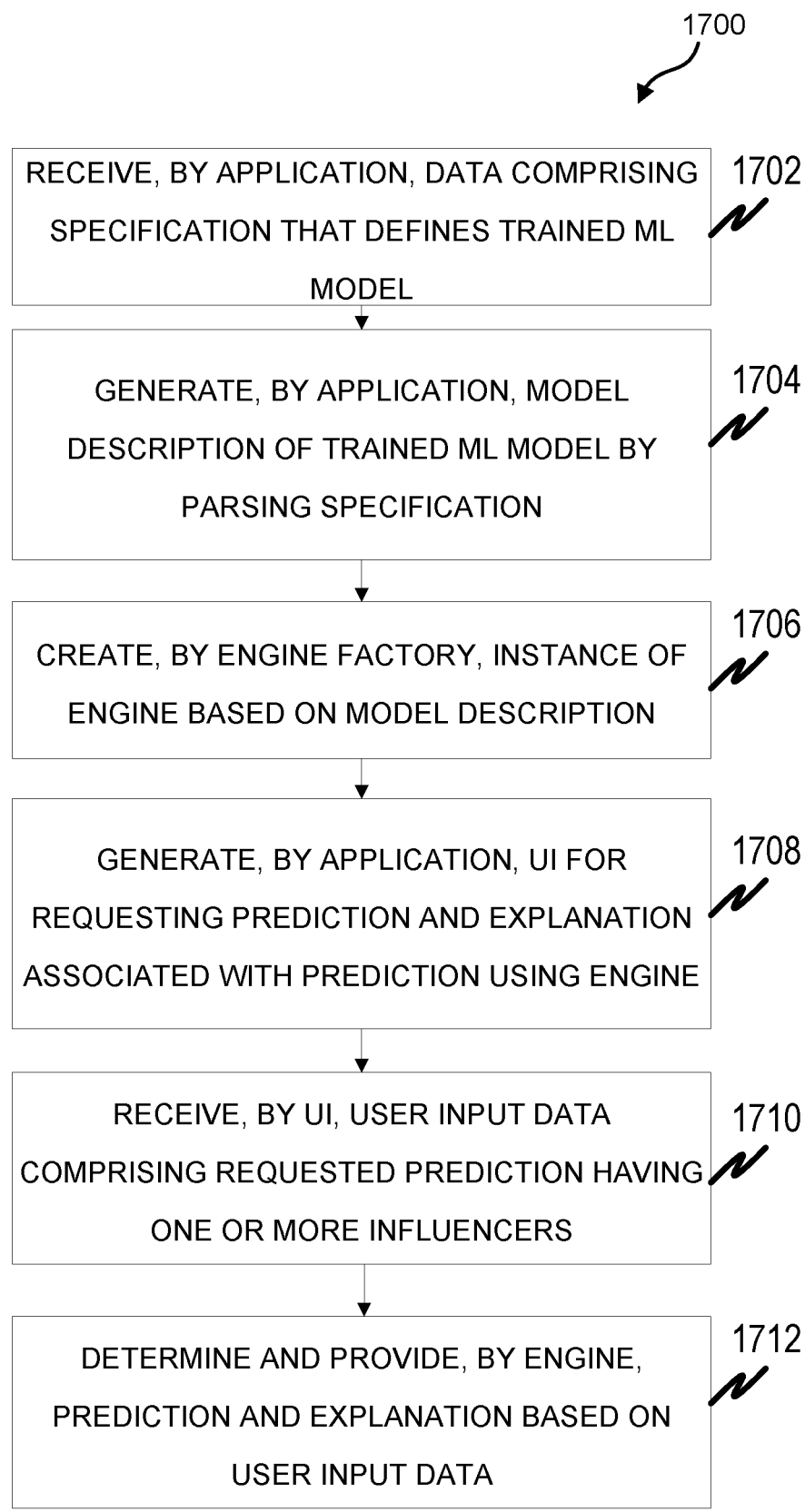
FIG. 17 depicts an example flowchart for generating a prediction and associated explanation for user input influencers.

FIG. 17 depicts an example flowchart 1700 for generating a prediction and associated explanation for user input influencers. An application receives, at 1702, data including a specification that defines a trained ML model. The application generates, at 1704, a model description of the trained ML model by parsing the specification. An engine factory creates, at 1706, an instance of an engine based on the model description. The application generates, at 1708, a UI for requesting a prediction and an explanation associated with the prediction using the engine. The generated UI receives, at 1710, user input data including a requested prediction. The requested prediction includes one or more influencers. The engine determines and provides, at 1712, the prediction and the explanation based on the user input data.

Figure 18:
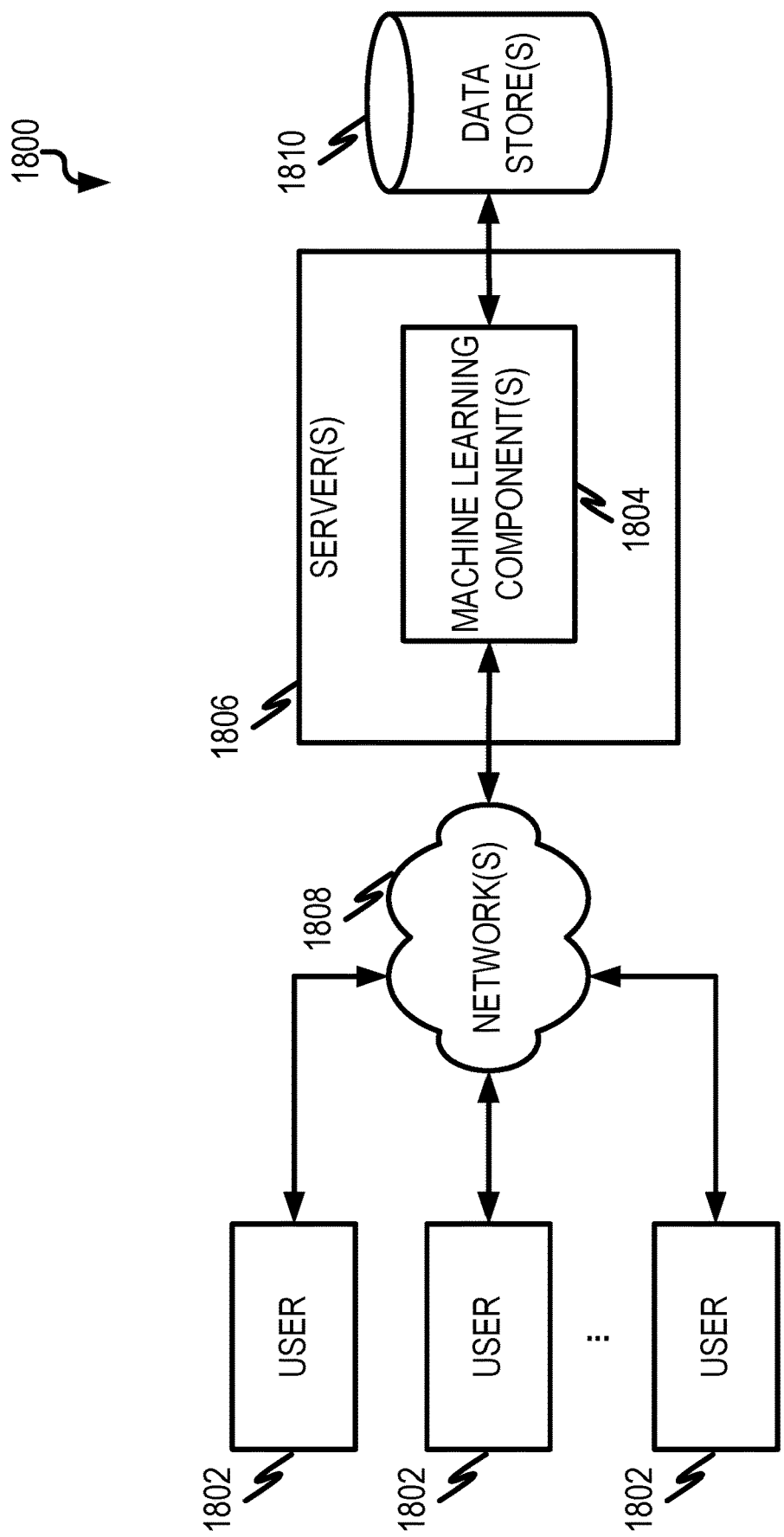
FIG. 18 illustrates an example computer-implemented environment for implementing various aspects described herein.

FIG. 18 illustrates an example computer-implemented environment 1800 wherein users 1802 can interact with server 1806 having machine learning component(s) 1804 for obtaining predictions and associated explanations as described herein, hosted on one or more servers 1806 through a network 1808.

As shown in FIG. 18, the users 1802 can interact with the machine learning component(s) 1804 through a number of ways, such as over one or more networks 1808. One or more servers 1806 accessible through the network(s) 1808 can host the machine learning component(s) 1804. The one or more servers 1806 can also contain or have access to one or more data stores 1810 for storing data for the machine learning component(s) 1804.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 19:
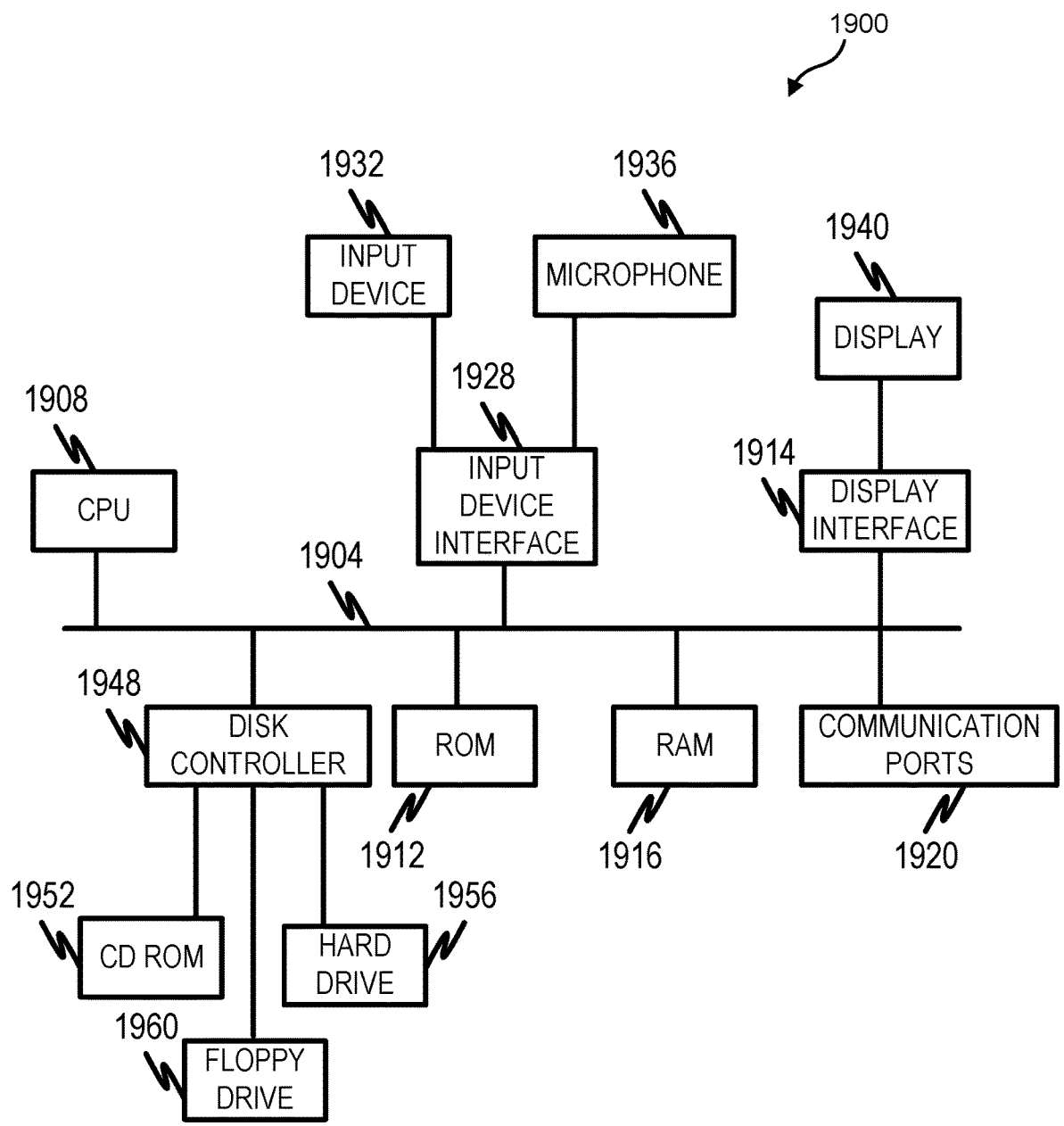
FIG. 19 is a diagram illustrating a sample computing device architecture for implementing various aspects described herein.

FIG. 19 is a diagram 1900 illustrating a sample computing device architecture for implementing various aspects described herein. A bus 1904 can serve as the information highway interconnecting the other illustrated components of the hardware. A processing system 1908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1912 and random access memory (RAM) 1916, can be in communication with the processing system 1908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1948 can interface one or more optional disk drives to the system bus 1904. These disk drives can be external or internal floppy disk drives such as 1960, external or internal CD-ROM, CD-R, CD-RW or DVD, or solid state drives such as 1952, or external or internal hard drives 1956. As indicated previously, these various disk drives 1952, 1956, 1960 and disk controllers are optional devices. The system bus 1904 can also include at least one communication port 1920 to allow for communication with external devices either physically connected to the computing system or available externally through a wired or wireless network. In some cases, the communication port 1920 includes or otherwise comprises a network interface.

To provide for interaction with a user, the subject matter described herein can be implemented on a computing device having a display device 1940 (e.g., a CRT (cathode ray tube) or LCD (liquid crystal display) monitor) for displaying information obtained from the bus 1904 to the user and an input device 1932 such as keyboard and/or a pointing device (e.g., a mouse or a trackball) and/or a touchscreen by which the user can provide input to the computer. Other kinds of input devices 1932 can be used to provide for interaction with a user as well; for example, feedback provided to the user can be any form of sensory feedback (e.g., visual feedback, auditory feedback by way of a microphone 1936, or tactile feedback); and input from the user can be received in any form, including acoustic, speech, or tactile input. In the input device 1932 and the microphone 1936 can be coupled to and convey information via the bus 1904 by way of an input device interface 1928. Other computing devices, such as dedicated servers, can omit one or more of the display 1940 and display interface 1914, the input device 1932, the microphone 1936, and input device interface 1928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processors forming part of at least one computing device, the method comprising:
   transmitting, from an application to a scoring equation service, a request comprising training data for machine learning (ML) components, the training data comprising one or more scoring equations;
   receiving, by the application, a received trained ML model from the scoring equation service based on the training data for the ML components responsive to the request;
   generating a user interface (UI);
   displaying, in the UI, a list of a plurality of trained machine learning (ML) models comprising at least the received trained ML model;
   receiving and processing a user selection, via the UI, of a particular trained ML model from the list of the plurality of trained ML models displayed in the UI;
   receiving, by the application, data comprising a specification which defines the particular trained ML model selected by the user;
   parsing, by the application, a model description of the particular trained ML model;
   creating, by an engine factory, an instance of an engine based on the model description after processing the received user selection of the particular trained ML model;
   displaying, in the UI, a request for a prediction and an associated explanation using the instance of engine;
   receiving, by the UI, user input data comprising a requested ML prediction and influencer values of two or more influencers;
   determining and displaying, by the instance of the engine, the requested prediction and the associated explanation, based on the user input data, wherein the displaying of the requested prediction and the associated explanation comprises displaying importance values for each of the two or more influencers; and
   displaying, in the UI, shorter feature names representing influencer names that are mapped to the two or more influencers.

2. The method of claim 1, wherein the determining the prediction and the explanation comprises:
   encoding the user input data into one or more numeric features;
   browsing a plurality of decision trees defined within the specification to provide a raw prediction score; and
   determining an importance value for each influencer, the importance value comprising either (i) a SHapley Additive exPlanation (SHAP) value or (ii) a SHAP value normalized as a z-score using a mean and a standard deviation associated with training data used to train the particular trained ML model.

3. The method of claim 1, wherein the prediction and the associated explanation comprises an array of individual contributions associated with each of the two or more influencers, the array comprising an influencer name and importance value computed for the influencer.

4. The method of claim 1, wherein the particular trained ML model is a regression model and the prediction comprises a prediction score.

5. The method of claim 1, wherein the particular trained ML model is a binary classification model or a multi-class classification model and the prediction comprises a prediction decision and a probability associated with the prediction decision.

6. The method of claim 1, further comprising:
   requesting, by the application, model information associated with the specification, the model information comprising at least one of a model type, a target name, or a target type.

7. The method of claim 1, further comprising:
   requesting, by the application, model influencers associated with the specification, the model influencers comprising at least one of a name, a value type, a storage type, or a listing of values.

8. The method of claim 1, wherein the particular trained ML model is trained using a gradient boosting technique and the trained ML model comprise a plurality of decision trees.

9. The method of claim 1, wherein the specification comprises an array of nodes of decision trees arranged in a predefined order and mapped variable names to feature names, wherein each feature name is an alphanumeric representation.

10. The method of claim 1, wherein the application is a cloud-based web application.

11. The method of claim 1, wherein the specification comprises a JavaScript Object Notation (JSON) specification.

12. The method of claim 1, wherein the instance of the engine is a XGBoost JavaScript Runtime.

13. A system comprising:
a data processor; and
memory storing instructions stored on the data processor, which when executed result in operations comprising:
transmitting, from an application to a scoring equation service, a request comprising training data for machine learning (ML) components, the training data comprising one or more scoring equations;
receiving, by the application, a received trained ML model from the scoring equation service based on the training data for the ML components responsive to the request;
generating a user interface (UI);
displaying, in the UI, a list of a plurality of trained machine learning (ML) models comprising at least the received trained ML model;
receiving and processing a user selection, via the UI, of a particular trained ML model from the list of the plurality of trained ML models displayed in the UI;
receiving, by the application, data comprising a specification which defines the particular trained ML model selected by the user;
parsing, by the application, a model description of the particular trained ML model;
creating, by an engine factory, an instance of an engine based on the model description after processing the received user selection of the particular trained ML model;
displaying, in the UI, a request for a prediction and an associated explanation using the instance of engine;
receiving, by the UI, user input data comprising a requested ML prediction and influencer values of two or more influencers;
requesting, by the application, model information associated with the specification, the model information comprising at least one of a model type, a target name, or a target type;
requesting, by the application, model influencers associated with the specification, the model influencers comprising at least one of a name, a value type, a storage type, or a listing of values;
determining and displaying, by the instance of the engine, the requested prediction and the associated explanation based on the model information and the model influencers, wherein the displaying of the requested prediction and the model influencers comprises displaying importance values for each of the two or more influencers,
wherein the prediction and the associated explanation comprises an array of individual contributions associated with each of the two or more influencers, the array comprising an influencer name and importance value computed for the influencer; and
displaying, in the UI, shorter feature names representing influencer names that are mapped to the two or more influencers.

14. The system of claim 13, wherein the determining the prediction and the explanation comprises:
encoding the user input data into one or more numeric features;
browsing a plurality of decision trees defined within the specification to provide a raw prediction score; and
determining an importance value for each influencer, the importance value comprising either (i) a SHapley Additive exPlanation (SHAP) value or (ii) a SHAP value normalized as a z-score using a mean and a standard deviation associated with training data used to train the ML model.

15. The system of claim 13, wherein the trained ML model is a regression model and the prediction comprises a prediction score.

16. The system of claim 13, wherein the trained ML model is a binary classification model or a multi-class classification model and the prediction comprises a prediction decision and a probability associated with the prediction decision.

17. The system of claim 13, wherein the trained ML model is trained using a gradient boosting technique and the trained ML model comprise a plurality of decision trees.

18. The system of claim 13, wherein (i) the application is a cloud-based web application, (ii) the instance of the engine is a XGBoost JavaScript Runtime, and (iii) the specification comprises a JavaScript Object Notation (JSON) specification that includes an array of nodes of decision trees arranged in a predefined order and mapped variable names to feature names, wherein each feature name is an alphanumeric representation.

19. A non-transitory computer program product storing instructions which, when executed by at least one data processor forming part of at least one computing device, result in operations comprising:
transmitting, from an application to a scoring equation service, a request comprising training data for machine learning (ML) components, the training data comprising one or more scoring equations;
receiving, by the application, a received trained ML model from the scoring equation service based on the training data for the ML components responsive to the request;
generating a user interface (UI);
displaying, in the UI, a list of a plurality of trained machine learning (ML) models comprising at least the received trained ML model;
receiving and processing a user selection, via the UI, of a particular trained ML model from the list of the plurality of trained ML models displayed in the UI;
receiving, by the application, data comprising a specification which defines the particular trained ML model selected by the user;
parsing, by the application, a model description of the particular trained ML model;
creating, by an engine factory, an instance of an engine based on the model description after processing the received user selection of the particular trained ML model;
displaying, in the UI, a request for a prediction and an associated explanation using the instance of engine;
determining and displaying, by the instance of the engine, the prediction and the associated explanation based on user input data comprising a requested prediction having two or more influencers, wherein the displaying of the requested prediction and the associated explanation comprises displaying importance values for each of the two or more influencers; and
displaying, in the UI, shorter feature names representing influencer names that are mapped to the two or more influencers.

20. The non-transitory computer program product of claim 19, wherein the trained ML model is trained using a gradient boosting technique and the trained ML model comprises a plurality of decision trees.

* * * * *